United States Patent [19]

Kampe et al.

[11] Patent Number: 5,015,534

[45] Date of Patent: May 14, 1991

[54] RAPIDLY SOLIDIFIED INTERMETALLIC-SECOND PHASE COMPOSITES

[75] Inventors: Stephen L. Kampe, Laurel; John M. Brupbacher; Leontios Christodoulou, both of Baltimore; Dennis C. Nagle, Ellicott City, all of Md.

[73] Assignee: Martin Marietta Corporation, Bethesda, Md.

[21] Appl. No.: 400,850

[22] Filed: Aug. 30, 1989

Related U.S. Application Data

[60] Division of Ser. No. 249,626, Sep. 26, 1988, Pat. No. 4,915,905, which is a continuation-in-part of Ser. No. 873,889, Jun. 13, 1986, Pat. No. 4,836,982, and Ser. No. 873,890, Jun. 13, 1986, Pat. No. 4,774,052, which is a continuation-in-part of Ser. No. 662,928, Oct. 19, 1984, abandoned.

[51] Int. Cl.$^5$ .................. C22C 14/00/21/00/32/00
[52] U.S. Cl. ..................... 428/570; 428/614
[58] Field of Search .................. 428/614, 570

[56] References Cited

U.S. PATENT DOCUMENTS

| | | | |
|---|---|---|---|
| 4,025,249 | 5/1977 | King | 425/6 |
| 4,240,824 | 12/1980 | Moskowitz et al. | 75/0.5 C |
| 4,268,564 | 5/1981 | Narasimhan | 428/143 |
| 4,343,750 | 8/1982 | Holiday et al. | 264/8 |
| 4,402,745 | 9/1983 | Ray et al. | 75/251 |
| 4,444,603 | 4/1984 | Yamatsuta et al. | 148/127 |
| 4,478,791 | 10/1984 | Huang et al. | 420/590 |
| 4,540,546 | 9/1985 | Giessen | 420/590 |
| 4,710,348 | 12/1987 | Brupbacher et al. | 420/129 |
| 4,774,052 | 9/1988 | Nagle et al. | 420/129 |
| 4,836,982 | 6/1989 | Brupbacher et al. | 420/129 |
| 4,836,983 | 6/1989 | Huang et al. | 420/418 |
| 4,842,820 | 6/1989 | Huang et al. | 420/418 |
| 4,916,028 | 4/1990 | Huang | 428/614 |

FOREIGN PATENT DOCUMENTS 519624  4/1940  United Kingdom .

OTHER PUBLICATIONS

Pickens et al "The Effect of Rapid Solidification on the Microstructure and Properties of Aluminum Powder Metallurgy Alloys", Rapid Solidification Processing, Principles and Technologies III, pp. 150–170, Claiters (1982).
Cohen et al "Rapid Solidification Processing-An Outlook", Rapid Solidification Processing, Principles and Technologies II, pp. 1–23, Claitors (1980).
Eltabir, "High Energy-High Rate Powder Processing of Aluminum-Silicon Carbide Metal-Matrix Composites" World Aluminum Ab. 89-440017 Apr. 1988.
Tha et al., "Dispersion Strengthened NiAl Alloys Produced by Rapid Solidification Processing" Metals Ab. 88-511804 Mar. 1988.
Ray et al. "Improved Iron-Base Alloys Made via Rapid Solidification Technology" Metals Ab. 86-540694 Sep. 1984.

*Primary Examiner*—R. Dean
*Assistant Examiner*—David W. Schumaker
*Attorney, Agent, or Firm*—Herbert W. Mylius; Alan G. Towner; Gay Chin

[57] ABSTRACT

This invention relates to a rapidly solidified product comprising a second phase in both a stable particulate form and a metastable flake form dispersed in an intermetallic matrix.

15 Claims, 2 Drawing Sheets

RAPIDLY SOLIDIFIED INTERMETALLIC-SECOND PHASE COMPOSITES

This invention was made with Government support under contract No N00014-86-C-2277 awarded by the U.S. Naval Research Lab. The Government has certain rights in this invention.

CROSS REFERENCE TO RELATED APPLICATION

This application, is a division of U.S. patent application Ser. No 249,626, filed Sept. 26, 1988, now U.S. Pat. No. 4,915,905 which is a continuation-in-part of U.S. patent application Ser. No. 873,889, now U.S. Pat. No. 4,836,982, and 873,890, now U.S. Pat. No. 4,774,052, both filed June 13, 1986, which are in turn continuations-in-part of Ser. No. 662,928, filed Oct. 19, 1984, now abandoned.

BACKGROUND OF THE INVENTION

The present invention relates generally to a process for the rapid solidification of certain composite materials and to a composite product having an intermetallic containing matrix including an in-situ precipitated second phase, such as another intermetallic phase or a ceramic material, wherein the second phase comprises a boride, carbide, oxide, nitride, silicide, sulfide, etc., or intermetallic of one or more metals.

1. Field of the Invention

For the past several years, extensive research has been devoted to the development of metal-ceramic composites, such as aluminum reinforced with carbon, boron, silicon carbide, silica, or alumina fibers, whiskers, or particles. Metal-ceramic composites with good high temperature yield strengths and creep resistance have been fabricated by the dispersion of very fine (less than 0.1 micron) oxide or carbide particles throughout the metal or alloy matrix. However, this technology has not extensively been used to produce composites having intermetallic matrices.

Intermetallics such as titanium aluminides are receiving increased attention for application as high performance structural materials. In particular, these ordered intermetallic compounds offer improved high temperature properties, including enhanced strength-to-weight ratios and oxidation resistance relative to conventional high temperature titanium alloys. However, general exploitation of these alloys has been limited by the lack of significant room temperature ductility and toughness, as well as the technical challenges associated with processing and/or machining the material into a final, usable form.

Compositing of titanium aluminides with particulate or fiber reinforcements creates the potential for additional improvements in alloy performance. For example, incorporation of a dispersed phase can result in direct strengthening of the matrix via dispersion or second-phase mechanisms, as well as stabilizing a fine matrix grain size. The latter can lead to additional improvements in processability (via enlargement of a stable processing "window"), as well as potential improvements in strength, ductility, and toughness.

Use of rapid solidification techniques creates the potential for additional alloying strategies, for example, the incorporation of rare earth alloying additions to produce a homogeneous, nanometer-scale rare earth oxide dispersion. Production of near-net-shape composite intermetallic components via powder metallurgy (P/M) techniques can minimize fabricability and machining problems inherent to intermetallic alloys.

2. Description of the Prior Art

Prior art techniques for the production of metal-ceramic composites may be broadly categorized as powder metallurgical approaches, molten metal techniques, and internal oxidation processes. The powder metallurgical type production of dispersion-strengthened composites would ideally be accomplished by mechanically mixing metal powders of approximately 5 micron diameter or less with the oxide or carbide powder (preferably 0.01 micron to 0.1 micron). High speed blending techniques or conventional procedures such as ball milling may be used to mix the powder. Standard powder metallurgy techniques are then employed to form the final composite. Conventionally, however, the ceramic component is large, i.e., greater than 1 micron, due to a lack of availability, and high cost, of very small particle size materials since their production is energy intensive, time consuming, and costly in capital equipment. Furthermore, production of very small particles inevitably leads to contamination of the particles with oxides, nitrides, and materials from various sources. Further, in many cases where the particulate materials are available in the desired size, they are extremely hazardous due to their pyrophoric nature.

Alternatively, it is known that proprietary processes exist for the direct addition of appropriately coated ceramics to molten metals. Further, molten metal infiltration of a continuous ceramic skeleton has been used to produce composites. In most cases, elaborate particle coating techniques have been developed to protect the ceramic particles from the molten metal during admixture or molten metal infiltration, and to improve bonding between the metal and ceramic. Techniques such as these have resulted in the formation of silicon carbide-aluminum composites, frequently referred to as SiC/Al, or SiC aluminum. This approach is only suitable for large particulate ceramics (e.g., greater than 1 micron) and whiskers, because of the high pressures involved for infiltration. The ceramic material, such as silicon carbide, is pressed to form a compact, and liquid metal is forced into the packed bed to fill the intersticies. Such a technique is illustrated in U.S. Pat. No. 4,444,603, of Yamatsuta et al, issued Apr. 24, 1984. Because of the necessity for coating techniques and molten metal handling equipment capable of generating extremely high pressures, molten metal infiltration has not been a practical process for making metal-ceramic composites.

The presence of oxygen in ball-milled powders used in prior art powder metallurgy techniques, or in molten metal infiltration, can result in oxide formation at the interface between the ceramic and the metal. The presence of such oxides will inhibit interfacial binding between the ceramic phase and the matrix, thus adversely effecting ductility of the composite. Such weakened interfacial contact can also result in reduced strength, loss of elongation, and facilitated crack propagation. In addition, the matrix may be adversely effected, as in the case of titanium, which is embrittled by interstitial oxygen.

Internal oxidation of a metal containing a more reactive component has also been used to produce dispersion strengthened metals, such as internally oxidized aluminum in copper. For example, when a copper alloy containing about 3 percent aluminum is placed in oxidizing atmosphere, oxygen may diffuse through the copper matrix to react with the aluminum, precipitating alumina. This technique, although limited to relatively few systems since the two metals utilized must have a wide difference in chemical reactivity, has offered a feasible method for dispersion hardening. However, the highest possible level of dispersoids formed in the resultant dispersion strengthened metal is generally insufficient to impart significant changes in properties such as modulus, hardness, and the like. In addition, oxides are typically not wetted by the metal matrix, so that interfacial bonding is not optimum.

Because of the above-noted difficulties with conventional processes, the preparation of metal-ceramic composites with submicron ceramic dispersoids for commercial applications has been extremely expensive.

Another class of materials which has seen considerable interest and development is intermetallic materials, especially intermetallics of aluminum such as the aluminides of titanium, zirconium, iron, cobalt, and nickel.

The need for the advanced properties obtainable with intermetallic materials is typified by their potential application to structures capable of withstanding high temperatures, such as turbine engines. In designing and operating turbine engines today and for the foreseeable future, there are two primary problems which demand solutions from the field of materials science. The first of these is the need to operate certain portions of the engine at higher gas and metal temperatures to improve operating efficiency and save fuel. The second problem is the need for lighter materials to decrease engine weight and engine operating stresses due to heavy rotating components, and to increase the operating life of disks, shafts, and bearing support structures. These latter structures require materials which are less dense than the nickel base superalloys they are intended to replace, but which possess roughly the same mechanical properties and oxidation resistance as those materials in current usage.

The intermetallics are typically highly ordered compounds, in the sense that they possess regularly repeating (e.g., A B A B A B) atom sequencing. Intermetallic compounds are particularly suited to these needs because of two properties which derive from the fact that they possess ordered structures. Modulus retention at elevated temperature in these materials is particularly high because of strong A-B bonding. In addition, a number of high temperature properties which depend on diffusive mechanisms, such as creep, are improved because of the generally high activation energy required for self-diffusion in ordered alloys.

The formation of long range order in alloy systems also frequently produces a significant positive effect on mechanical properties, including elastic constants, strength, strain-hardening rates, and resistance to cyclic creep deformation. Finally, in the case of aluminides, the resistance to surface oxidation is particularly good because these materials contain a large reservoir of aluminum that is preferentially oxidized.

However, during metallurgical processing, one problem encountered is that these materials tend to form coarse grains, which degrade certain mechanical properties, the most important of which is ductility. Also, in many intermetallics the strong A-B bonding results in low temperature brittleness, although the exact mechanism of the ductile-brittle transition seems to be different for the different intermetallic compounds. It is thus necessary to address the problem of minimal low temperature ductility without destroying the inherent high temperature strength and stiffness. In the prior art it has generally been considered that these latter high temperature properties may only be retained by preserving the ordered structure, hence sacrificing low temperature ductility.

Since the early 1970's, the pace of work on ordered alloys and intermetallic compounds has slackened, as a result of lack of progress in improving either ductility or creep resistance of these otherwise very intriguing alloys.

Interest in utilizing ordered alloys for structural applications was reawakened in the United States when researchers discovered that ductility and strength improvements could be achieved in TiAl and $Ti_3Al$ based alloys using a combination of powder metallurgy and alloying techniques. Later work on the titanium aluminides utilized ingot metallurgy. The development of rapid solidification methods led to renewed interest in the iron and nickel aluminides. The replacement of cobalt in $Co_3V$ by nickel, and then iron, led to a series of face-centered cubic $L1_2$-type superlattices with greater ductility at ambient temperatures. Also, it has been reported in Japan that polycrystalline $Ni_3Al$ can be made more ductile by adding small quantities of boron. Later, this work was confirmed and the critical composition range over which boron was beneficial was identified. (See U.S. Pat. No. 4,478,791 of Huang et al, assigned to General Electric.) These discoveries, together with the national search for replacements for strategic metals, such as cobalt and chromium, and the need to develop energy-efficient systems, have in the past few years stimulated much additional works, largely in the area of improving low temperature ductility and increasing high temperature strength.

An example of work related to intermetallic matrix composites is taught in U.S. Pat. No. 4,774,052, of which this is a continuation-in-part. This patent application teaches a method for forming composite materials of descretely dispersed particulate second phase materials in intermetallic matrices, particularly in aluminide matrices. The dispersed material may constitute a second phase such as a ceramic, or an intermetallic compound other than the matrix metal.

Similarly, extensive research and development has been conducted in the area of rapid solidification (RS) processing. Rapid solidification processing effects highly desired forms of alloys. Homogeneous material at or above melt temperatures is subjected to a rapid quench or temperature drop to "freeze" the material to desired microstructure. The rate at which the melt is quenched is in the range of approximately $10^{4°}$ C. per second to $10^{8°}$ C. per second. See, for example, U.S. Pat. No. 4,402,745, hereby incorporated by reference.

Current technological interest in materials produced by RS processing, especially when used to produce fine powders followed by consolidation into bulk parts, may be traced, in part, to problems associated with the chemical segregation that occurs in complex, highly alloyed materials during conventional ingot casting and processing. During processing via slower cooling rates used for conventional casting processes, solute partitioning, that is, macro-and micro-segregation of different alloy phases present in these alloys, and the formation of undesirable, massive particle boundary eutectic phases, can occur. Metal powders produced directly from the melt by conventional powder production techniques, that is, drop tower, inert gas or water atomization of the melt, are usually cooled at rates three to four orders of magnitude lower than those that can be obtained by RS processing. The latter removes macro-segregation altogether and significantly reduces spacing over which micro-segregation occurs, if it occurs at all.

Design of alloys made by conventional slow cooling processes is primarily dictated by the corresponding equilibrium phase diagrams. Alloys prepared by such processes are in, or at least near, equilibrium. The advent of rapid quenching from a melt has enabled divergence from equilibrium and has added new alloys with unique structures and properties for commercial use.

Rapid quenching, or rapid solidification, techniques are known for manufacture of metal powder for powder metallurgical (PM) purposes by finely "atomizing" molten metal. Here, RS occurs not by contact but "in-flight". This technique permits little time for particle growth. The small drops produced solidify to form small granules, each one of which essentially constitutes an "ingot" of the molten metal. These small granules can be charged into a container that is evacuated and sealed. Afterwards, the small granules are compacted and concurrently or subsequently heated. This compaction and heating joins together the granules into a solid metal compact of the molten metal composition. This method is valuable for producing homogeneous materials from melt alloys which, if conventionally processed, would result in large-scale heterogeneities and segregation. Additionally, RS can produce materials containing fine metastable dispersoids and second phases.

Prior art techniques for "atomizing" molten metal have included impingement, melt spinning, and nozzle atomization.

In impingement techniques, atomization of molten metal into small drops is usually brought about in inert gas, such as argon or nitrogen. The gas impinges as high speed jets upon a pouring stream of molten metal. Water and steam have also been used. However, water and steam are unsuitable in certain instances because they cause severe oxidation of granules.

It is also known to atomize a pouring stream by impingement onto a rotating disk to make small drops or "ingots" which then solidify by contact with the surrounding atmosphere, cooling-water or oil bath, or a coolant shower. As mentioned above, in this approach the solidification does not occur by contact with the disk. That contact forms the drops or spheres which can have nearly monosize distribution.

British Patent Specification No. 519,624, hereby incorporated by reference, relates to powdered or granular metallic products constituted of solidified metallic particles derived from molten metal. It also describes a method of producing the product. These solidified metallic particles have spontaneously crystallized from a metastable undercooled state at a predetermined temperature below but close to the freezing point of the metal. The particles have substantially uniform size and composition To produce such particles, molten metal is discharged from a suitable receptacle in one or more streams onto a metal surface of such nature that sufficient heat is abstracted from the molten metal to lower its temperature to that of an undercooled state, that is, to a temperature which is slightly below the freezing point of the particular metal but without causing solidification or crystallization. This surface upon which the molten metal impinges can be a belt or a disk rapidly moving either linearly or rotatively, respectively. The molten metal is immediately converted into a stream of film-like proportions on the surface and the extent of the belt or disk surface is such that the molten metal makes contacts therewith for a period just sufficient to undercool it as above defined. Then the molten metal is caused to leave the supporting surface and to continue its travel in the same direction and at substantially the same speed for a sufficient distance to cause solidification. Because the undercooled stream of film-like proportions has little or no integrity, it immediately breaks up into a myriad of fine, small liquid particles which solidify to form a powdered metal.

These operations may be carried out in a vacuum or suitable atmosphere, and the myriad of fine, small liquid particles may be passed through a coolant to hasten solidification of the particles or to reduce the distance needed for solidification. During solidification, surface tension causes the particles to assume a substantially spherical shape.

One known rapid solidification technique involving a centrifugal atomizing process is taught in U.S. Pat. Nos. 4,025,249 and 4,343,750, hereby incorporated by reference. It uses forced convective cooling of molten droplets to achieve cooling rates on the order of $10^5$–$10^{6°}$ C./sec. This rapid solidification state is designated RSR. Such a RS technique, in conjunction with powder metallurgy techniques for consolidation of the rapidly solidified powders, has produced materials with metastable phases, very fine grain structures, high room-temperature strength and good high temperature properties up to the point of instability of the metastable phases.

An approach to further enhance certain material properties is to blend the RS powder with ceramic powders prior to consolidation. This leads to improvement in some mechanical properties, for example, modulus, hardness, etc. Silicon carbide aluminum (SiC/Al), such as commercially available SiC/7090, produced by an RS/PM approach is an example of such a material. The difficulty with this approach is that it suffers from property and processing disadvantages inherent to a PM process. These difficulties include a relatively coarse reinforcement (greater than 1 micron) and/or weak metal/ceramic interfaces due to surface contaminants.

One alternative to conventional RS/PM techniques for developing dispersion strengthened alloys is to form the ceramic dispersoid phase during RS processing. U.S. Pat. No. 4,540,546, hereby incorporated by reference, describes a "Melt Mix Reaction" (MMR) process involving chemically reacting two starting alloys in a mixing nozzle in which a melt mix reaction takes place between the chemically reactable components of starting alloys to form submicron particles of the resulting compound in the final alloy. The mixing and chemical reaction is performed at a temperature which is at or above the highest liquidus temperature of the starting alloys but which is also substantially below the liquidus temperature of the final alloy, and as close to the solidus temperature of the final alloy as possible. While dispersion-strengthened alloys can be produced by this technique, there appear to be a number of inherent difficulties. First, processing is technically complex. Second, efficient mixing is important if fine dispersions are to be consistently produced. Lastly, very high degrees of superheat would be required to completely dissolve the RS alloying elements in order to produce high dispersoid loadings, which necessarily accentuate particle growth, for example, in one containing 10–20% dispersoid.

In U.S. Pat. No. 4,240,824, hereby incorporated by reference, Moskowitz et al describe a process for producing a boron-containing nickel or cobalt spray-and-fuse self-fluxing alloy powder containing an internally precipitated chromium boride or nickel boride. In this patent, the starting materials are alloys containing precursors of the hard precipitate, and the melt is pre-cooled to a temperature about 50° F. higher than the viscous temperature prior to atomization. The particles are formed in the secondary atomization step, and are preferably larger than 10–15 microns in average particle size. No teaching is found for precipitating the particulate material prior to the atomization steps, or of precipitates having an average size less than 1 micron.

Narasimhan, in U.S. Pat. No. 4,268,564, hereby incorporated by reference, teaches the preparation of sheets or strips of amorphous metal containing embedded particulate matter, of 1 to 100 micron particle size, by forcing a glass-forming alloy containing particulate matter, formed in-situ, onto a rapidly moving chill surface. This technique was considered surprising because it had previously been believed that incorporation of particulate matter, especially of wettable particulate matter, into a molten glass-forming alloy would preclude quenching into an amorphous body due to nucleation of crystallization. Further, inclusion of particulate material in the metal melt in a melt spin process has led to rapid plugging of the orifice. The reference does not teach preparation of a rapidly solidified powder having an evenly dispersed particulate material therein. In fact, the reference specifically teaches that the particulate material is concentrated at the surface of the strip material produced.

These prior art techniques produce conventional powdered metal products.

U.S. Pat. No. 4,836,982, of which this application is a continuation-in-part, relates to an invention which overcomes the disadvantages of the prior art noted above, including current rapid solidification technology, and provides for the rapid solidification of composite materials comprising metal and metal alloy matrices.

The cited invention may also result in improvement from incorporation of a stable dispersoid into the composite which extends the high temperature working range of the composite, in contrast to conventional RS composites that typically contain metastable phases. Moreover, incorporation of dispersoids prior to RS may provide surfaces for precipitation, and consequently, a more efficient precipitation of metastable rapid solidification phases. In some cases, for example, titanium-based alloys, the addition of rare earth elements, like cerium or erbium, to the dispersoid-containing melt may result in improved scavenging of interstitials such as oxygen, leading to the formation of an additional oxide dispersoid and effective deoxidation of the matrix alloy.

It has now been found that one may form an intermetallic-second phase composite in accordance with the teachings of U.S. Pat. No. 4,774,052, and subject such material to rapid solidification in accord with the teachings of U.S. Pat. No. 4,836,982, to achieve a rapidly solidified intermetallic matrix of very fine grain size having a second phase dispersed therein.

SUMMARY OF THE INVENTION

This invention relates to a method for the production of rapidly solidified intermetallic-second phase composite materials. The method involves the formation of a composite material comprising an intermetallic containing matrix having in-situ precipitated second phase particles dispersed therein. This composite is subsequently subjected to rapid solidification processing to produce a composite powder.

The present invention relates to a rapidly solidified product containing a preformed dispersion of in-situ precipitated second phase particles in an intermetallic matrix, produced by reacting second phase forming constituents in the presence of an intermetallic in which the constituents are more soluble than the second phase.

The invention further relates to a rapidly solidified composite containing a preformed dispersion of second phase, having a particle size of from about 0.01 to about 5 microns, in a matrix of an intermetallic in which the constituents of said second phase are soluble and the second phase is substantially insoluble.

Thus, it is a particular purpose of this invention to provide rapid solidification products containing in-situ precipitated second phases in an intermetallic matrix composite. This approach provides an alternative to conventional ingot metallurgy or powder metallurgy techniques as a means of preparing composites for rapid solidification atomization. The importance of this distinction resides in the fact that most composites prepared by conventional techniques are unsuitable for atomization. The advantages of the present method and product of this invention will become more readily understood by consideration of the following description and examples.

BRIEF DESCRIPTION OF THE FIGURES

FIG. 1 is a photomicrograph showing a cross section of a rapidly solidified titanium aluminide-titanium diboride composite powder produced in accordance with the present invention.

FIG. 2 is a photomicrograph showing a cross section of a conventional unreinforced rapidly solidified titanium aluminide powder possessing a dendritic microstructure.

FIG. 3 is a photomicrograph showing the microstructure of a rapidly solidified titanium aluminide-titanium diboride composite powder produced in accordance with the present invention wherein a bimodal distribution comprising equiaxed $TiB_2$ particulates and fine flake-like $TiB_2$ particulates is present within the titanium aluminide matrix.

FIG. 4 is a photomicrograph showing the microstructure of a rapidly solidified, heat treated titanium aluminide-titanium diboride composite powder produced in accordance with the present invention wherein a bimodal distribution comprising equiaxed $TiB_2$ particulates and fine spherodized $TiB_2$ particulates is present within the titanium aluminide matrix.

DESCRIPTION OF PREFERRED EMBODIMENTS

The present invention relates to a rapid solidification process utilizing preformed intermetallic-second phase materials, produced by an in-situ precipitation process. Overall, it is the purpose of the present disclosure to describe an approach to producing intermetallic rapid solidification powders having dispersoids therein by a relatively simple method. Materials thus produced possess improved mechanical properties compared to those produced by known techniques, while maintaining known advantages. The method of producing rapidly solidified products of the present invention differs from prior art in that at least one dispersed phase pre-exists in the intermetallic product prior to the rapid solidification treatment. The process thereby circumvents the need for an excessive degree of superheat required in order to dissolve alloying elements and permits inclusion of higher amounts of dispersoids. Further, the invention avoids the need for controlling excessive reaction exothermicity released during formation of dispersoids in the prior art, and allows greater latitude in selection of dispersoids and reactant concentration.

An in-situ precipitation technique is described in detail in U.S. Pat. No. 4,710,348, hereby incorporated by reference. The preparation of suitable intermetallic-second phase composites is described in detail in U.S. Pat. No. 4,774,052, and application Ser. No. 190,561; 190,547 and 156,682, hereby incorporated by reference. The specific rapid solidification technique utilized in the present invention is described in detail in U.S. Pat. No. 4,836,982, incorporated by reference, filed June 13, 1986.

Broadly stated, the present invention constitutes the rapid solidification of novel intermetallic-second phase composite materials. The materials which are subjected to rapid solidification are prepared by a process whereby elements forming a second phase precipitate react in a solvent matrix material containing an intermetallic, or at least one precursor thereof, to form a finely-divided dispersion of the second phase material in the solvent matrix material. While ceramic materials constitute the preferred second phase dispersoids, it is also possible to precipitate intermetallic dispersoids as well. In such instances, the dispersoid and matrix must be of different intermetallic composition. While the discussion herein shall focus upon ceramic materials as the second phase, it must be borne in mind that intermetallic second phases are also to be included in the scope of the present invention.

Exemplary of suitable second phase precipitates are the borides, carbides, oxides, nitrides, silicides, oxynitrides, sulfides, and oxysulfides. Suitable elements include all of the elements which are reactive to form ceramic precipitates, including, but not limited to, transition elements of the third to sixth groups of the Periodic Table. Particularly useful ceramic phase forming constituents include aluminum, titanium, silicon, boron, carbon, oxygen, nitrogen, sulfur, molybdenum, tungsten, niobium, vanadium, zirconium, chromium, hafnium, cobalt, nickel, iron, magnesium, tantalum, manganese, zinc, lithium, beryllium, thorium, and the rare earth elements including scandium, yttrium, lanthanum and the lanthanide series elements such as cerium and erbium. Reactive compounds of such elements, such as $B_2O_3$, $B_4C$, and $BN$ may also be used.

It is especially to be noted that plural dispersoids, and/or complex compounds such as titanium zirconium boride, may advantageously be precipitated in-situ in the intermetallic matrix. Additionally, particles having whisker-like morphology may be precipitated, such as titanium niobium and boride.

Composites of relatively low oxygen content may be produced by incorporation of small amounts (e.g., up to about 5 percent, dependent upon oxygen content of the matrix) of strong oxide formers, such as yttrium or any of the rare-earth metals, e.g., cerium and erbium, which will scavenge oxygen from the solvent matrix material. The exothermic temperature rise of the reaction mass, in conjunction with the increased surface area of the dispersoid formed, may effectively improve scavenging capability. The oxide particles thus formed enhance matrix ductility by removal of interstitial oxygen, and may also serve to dispersion strengthen the matrix and reduce grain size therein, in turn further enhancing matrix ductility. Further, it is to be noted that in many intermetallic-ceramic composites prepared by the method of the present invention, intermetallic precursors will also react with ceramic constituents to form additional ceramic dispersoids.

As the matrix or solvent metal, one may use an intermetallic, or precursors thereof, capable of dissolving or at least sparingly dissolving the constituents forming the second phase, and having a lesser capability for dissolving or otherwise reacting with the formed second phase precipitate. Thus, at the temperatures experienced during the process, the matrix component may act as a solvent for at least one of the second phase-forming constituents, but not for the desired second phase precipitate. It is important that the second phase-forming reaction goes to substantial completion by consuming the reactants. While the potential choice of second phase dispersoids and matrix materials is large, this choice is limited by adherence to the criteria herein-above recited.

The solvent metal precursors for the intermetallic matrix may be selected from the group consisting of aluminum, nickel, copper, titanium, cobalt, iron, platinum, gold, silver, niobium, tantalum, boron, zinc, molybdenum, yttrium, hafnium, tin, tungsten, lithium, magnesium, beryllium, thorium, silicon, chromium, vanadium, zirconium, manganese, scandium, lanthanum, and rare earth elements and alloys thereof. Preferred intermetallic precursors include aluminum, nickel, titanium, cobalt, silicon, iron, and refractory metals. Plural intermetallic materials may, of course, be present in the matrix. It is noted that the terms intermetallic containing matrix, or intermetallic matrix, as used herein, are meant to define a matrix which is predominantly intermetallic, although other materials, e.g., metal intermetallic precursors, may also be present in lesser amount.

Aluminides and silicides constitute the preferred intermetallic matrix materials of the present invention. Among the metallic elements capable of forming aluminides are titanium, nickel, iron, cobalt, and refractory metals such as niobium, zirconium, tantalum and the like. Titanium forms the aluminides $Ti_3Al$, $TiAl$, and $Al_3Ti$, while nickel forms $Ni_3Al$ and $NiAl$. Other aluminides include $Zr_3Al$, $Co_3Al$ and $Fe_3Al$. For the purposes of the present invention, the aluminides of titanium and nickel and the silicides of titanium are presently preferred. Substitution of one or more elements within an intermetallic compound is possible, and may be desirable to effect crystal lattice changes. Exemplary is the substitution of aluminum by titanium in $Ni_3Al$ to form $Ni_3(Al, Ti)$. In addition, two phase mixtures such as $TiAl$ and $Ti_3Al$ or $TiAl$ and $TiAl_3$ are suitable. Further, $TiAl$ containing matrices may contain retained beta and ordered beta (B2).

It should be recognized that aluminides are not necessarily of a composition such that the components are present as exact integers. For example, nickel aluminide is commonly referred to as $Ni_3Al$ although it is an intermetallic phase and not a simple ionic or covalently bonded compound, as it exists over a range of compositions as a function of temperature, e.g., about 72.5 to 77 weight percent nickel (85.1 to 87.8 atomic percent) at about 600° C. Thus, aluminides, and intermetallics generally, may be defined as the compounds which form upon solidification of near stoichiometric amounts of the appropriate metals. In the molten state, however, the intermetallics exist primarily as a random mixture of the elements thereof, possessing only relatively short range order. Within the scope of the present invention, this random mixture, or intermetallic derived liquid, may act as a solvent matrix material through which the solvent assisted reaction of second phase precursors occurs. This molten state may thus be referred to as an "intermetallic derived solvent", or "solvent matrix material" which terms also encompass the molten state of one or more precursors of said intermetallic.

For the purpose of illustrating the various reaction modes that may be used to form a second phase dispersion within an intermetallic matrix, one is referred to the previously cited U.S. Pat. No. 4,774,052.

Varying amounts of ceramic may be incorporated into the composite material, depending upon the end use and the properties desired in the product. As previously noted, for dispersion strengthened materials having high modulus, one may utilize a preferred range of from about 10 percent by volume to about 25 percent by volume. However, the ceramic volume fraction may be varied considerably, so as to produce a composite with the desired combination of properties, within the range of from about 0.5 percent by volume up to the point at which ductility is sacrificed to an unacceptable extent. In contrast, cermet-like composites of up to about 95 percent or more by volume of ceramic material in the aluminide containing matrix may be produced. Preferred ranges for such materials will, of course, be dependent upon the desired end use. It is possible to effectively tailor the composition to achieve a spectrum of properties by controlling the proportions of the reactant and solvent materials.

As was previously stated, the first stage of the present invention provides for the formation of one or more finely dispersed precipitates in a matrix of one or more intermetallic containing materials. It is important that the second phase precipitate material is not soluble in, or reactive with, the intermetallic derived solvent, while the constituents of the second phase, individually, are at least sparingly soluble in the intermetallic derived solvent. Thus, the exothermic dispersion reaction mechanism depends upon a certain amount of each second phase forming constituent dissolving and diffusing in the intermetallic derived solvent, and while in solution (either liquid or solid state), reacting exothermically to form the insoluble precipitate rapidly as a very fine particulate. The intermetallic derived solvent or solvent matrix material provides a medium in which the reactive elements may diffuse and combine. Once the initial reaction has occurred, the heat released by the exothermic reaction causes additional diffusion of reactive components in the solvent matrix material, and allows the reaction to proceed. During the initiation and reaction extremely high temperatures may be achieved in very short periods of time. During this time frame, essentially all of the reactive constituents in the solvent metal react to form the insoluble second phase, which immediately precipitates.

The reaction mass may be subjected to conventional RS immediately following the dispersoid forming reaction. Alternatively, the reaction mass may be solidified, alloyed, or further processed for subsequent RS. Techniques available for RS include melt spinning or atomization, to produce in ribbon or droplet form a matrix metal having submicron ceramic or intermetallic particles dispersed therein. Conventional RS processing is taught in J. R. Pickens et al, *The Effect of Rapid Solidification On The Microstructure And Properties Of Aluminum Powder Metallurgy Alloys.* Rapid Solidification Processing, Principles and Technologies III, pp. 150-170, Claitors (1982); and M. Cohen et al, *Rapid Solidification Processing-An Outlook,* Rapid Solidification Processing, Principles and Technologies, ii, pp. 1-23, Claitors (1980), hereby incorporated by reference. RS processing concerns liquid alloys subjected to cooling rates on the order of about $10^{4}$° C. per second to $10^{8}$° C. per second. Several techniques are well established in the state of the art to economically fabricate RS alloys as ribbons, filaments, wires, flakes or powders alone or in combination in large quantities.

The most common methods of consolidation of RS processing powders are hot isostatic pressing and hot extrusion. Superplasticity may be involved in some cases and, if so, it permits isothermal forging of extruded billets into near-final shapes. Of course, the latter feature is also embodied in hot isostatic pressing.

Incremental solidification (otherwise called layer glazing) provides a way of building up a three-dimensional shape by means of rapidly solidified layers. The rapid solidification and consolidation can also be carried out concurrently. Whatever the method of consolidation, the structure/property relationships stemming from the rapid solidification will depend upon the efficacy of the consolidation process as well as on the final heat treatment.

The following examples illustrate the precipitation of fine articles of a dispersoid to produce a composite having an aluminide containing matrix.

EXAMPLE 1

An intermetallic-ceramic composite containing about 35 weight percent titanium diboride particles dispersed in a matrix of titanium aluminide ($Al_3Ti$) is prepared as follows. A well-blended mixture of 202.5 grams of aluminum, 239.5 grams of titanium and 55.7 grams of boron is made from powders of the respective elements and the mixture then isostatically compacted with a pressure of about 35,000 psi. The formed compact is heated in an inconel retort and a reaction initiated at about 660° C., causing melting of the compact. Upon removal from the retort, the compact is subjected to X-ray analysis which indicates the presence of $TiB_2$ and $Al_3Ti$ with only trace amounts of the initial elements. An SEM analysis indicates that the titanium diboride particles are submicron and dispersed in a titanium aluminide matrix. EDS analysis of the particles indicates that the particles are essentially pure titanium diboride.

EXAMPLE 2

An intermetallic-ceramic composite of titanium diboride particles in a matrix of titanium aluminide ($Ti_3Al$) is prepared as follows. A mixture of 67.5 grams of aluminum, 359.2 grams of titanium and 55.7 grams of boron is thoroughly blended and the mixture then compacted and heated in the manner of Example 1. The reaction temperature is observed to be about 660° C. The resultant material upon solidification is a dispersion of fine particles of titanium diboride in a matrix of titanium aluminide (Ti$_3$Al).

EXAMPLE 3

An intermetallic-ceramic composite containing 35 weight percent fine titanium diboride particles in a matrix of titanium aluminide (TiAl) is prepared as follows. A powdered mixture of about 117 grams powdered aluminum, about 328 grams titanium and about 56 grams of boron is prepared and mixed well to insure uniformity. The mixture is compacted and heated in the manner of Example 1 to yield a composite of fine titanium diboride particles in a matrix of TiAl. Analysis of the composite also reveals a minor amount of Ti$_3$Al.

EXAMPLE 4

An intermetallic-ceramic composite of zirconium diboride particles dispersed in titanium aluminide (Ti$_3$Al) is prepared as follows. A mixture of 10.8 grams zirconium, 2.5 grams boron, 76.6 grams titanium and 13.8 grams aluminum is thoroughly blended and then processed in a manner similar to that of Example 1 to yield the composite.

EXAMPLE 5

An intermetallic ceramic composite of zirconium diboride particles dispersed in a matrix of nickel aluminide (Ni$_3$Al) is prepared. Two mixtures, each containing 97 grams of zirconium, 23 grams of boron, 243 grams of nickel and 37.2 grams of aluminum are blended thoroughly. One mixture is heated to reaction initiation temperature in a resistance heated furnace, and the other heated to reaction initiation temperature by induction heating. The resultant composites each contain a small amount of unreacted nickel. When subjected to fracturing forces, these composites have a fracture surface which exhibits microvoid coalescence, which tends to indicate that the mode of fracture was a ductile one, consistent with the fine grain size of the aluminide matrix.

EXAMPLE 6

A mixture of nickel, aluminum, titanium, and boron in the stoichiometric proportions for the formation of nickel aluminide (Ni$_3$Al) and titanium diboride (TiB$_2$), i.e., 10 percent by weight aluminum, 62 percent by weight nickel, 19 percent by weight titanium, and 9 percent by weight boron, is compacted to 40,000 pounds per square inch, and then heated in a furnace. Upon reaching 620° C., a rapid exotherm is noted, which subsequent analysis by X-ray diffraction and scanning electron microscopy identifies as resulting from the formation of titanium diboride particles in a nickel aluminide matrix. It is evident from this experiment that a ceramic phase, e.g., titanium diboride, could be directly precipitated in an intermetallic phase, e.g., nickel aluminide, provided the affinity of the ceramic-forming species for each other is greater than either has for the two elements making up the intermetallic matrix.

EXAMPLE 7

An intermetallic-ceramic composite of titanium diboride particles dispersed in a matrix of nickel aluminide (Ni$_3$Al) is prepared as follows. A mixture of 103.5 grams titanium, 46.5 grams boron, 302.5 grams nickel, and 47.5 grams aluminum is blended and then isostatically pressed. About 100 grams of the pressed compact is then reacted in a retort. From a temperature probe placed adjacent to, but not touching the compact, the reaction apparently occurs at about 807° C. and the temperature during reaction peaks at about 1050° C. X-ray diffraction of the resultant composite indicates the presence of TiB$_2$, Ni$_3$Al, and residual Ni.

EXAMPLE 8

In a series of experiments, the formation of each of the dispersoids hafnium carbide, zirconium carbide, titanium carbide, titanium boride, titanium diboride, and vanadium diboride in the matrices of titanium aluminide (Ti$_3$Al) and nickel aluminide (Ni$_3$Al) is investigated. In preparing the various composites, the constituents forming the ceramic dispersoid and the components forming the aluminide containing matrix are reacted at the same time. The constituents and components in the reacting mixture are combined in such proportions so as to yield an intermetallic matrix composite containing about 40 weight percent ceramic dispersoid. The reactions for each composite are conducted twice, one of the reactions being conducted under an argon atmosphere and the other under vacuum. Induction heating is used to initiate each reaction, and at the first indication of a reaction, power to the induction heating unit is terminated so that the composite may cool as quickly as possible.

Upon completion of the reaction, each of the formed ceramic-aluminide composites is examined by X-ray diffraction analysis to determine its composition. In addition, a small amount of the matrix is dissolved in acid and the ceramic particles are observed for particle size by a scanning electron microscope and also examined by X-ray diffraction to determine the particle composition.

The results of these observations are set forth in Table I.

TABLE I

| Desired Compound Dispersoid/ Matrix | Reacted under Argon | | | Reacted Under Vacuum | | | |
|---|---|---|---|---|---|---|---|
| | Major Component | Minor Component | Particle Size | Major Component | Minor Component | Particle Size (micron) | Comment |
| HfC/Ni$_3$Al | HfC, Ni$_3$Al, Ni | Hf, Al$_2$Hf | 0.1–2 | HfC, Ni$_3$Al, Ni | Hf | 0.1–1.3 | Amount of Al$_2$Hf was very small |
| HfC/Ti$_3$Al | HfC, TiC, Ti$_3$Al, Ti | Ti$_3$AlC | 0.1–1.2 | HfC, TiC, Ti$_3$Al, AlTi$_2$ | Ti$_3$AlC | 0.5 | |
| VB$_2$/Ni$_3$Al | VB$_2$, Ni, Al, V$_3$B$_4$ | — | 0.1–1.3 | VB$_2$, Ni$_3$Al, V$_3$B$_4$, Ni, Al | V | 1–2 | |
| VB$_2$/Ti$_3$Al | Ti$_3$Al, V$_3$V$_4$, Al$_{11}$V, Al$_6$V | V, TiB$_2$ | none | Ti$_3$Al, Al$_{11}$V | TiB$_2$, Al$_6$V | none | |
| TiC/Ni$_3$Al | TiC, Ni$_3$Al, Ni | — | 0.1–2 | TiC, Ni$_3$Al, Ni | — | 0.1–1.5 | |

TABLE I-continued

| Desired Compound Dispersoid/ Matrix | Reacted under Argon | | | Reacted Under Vacuum | | | |
|---|---|---|---|---|---|---|---|
| | Major Component | Minor Component | Particle Size | Major Component | Minor Component | Particle Size (micron) | Comment |
| TiC/Ti₃Al | TiC, Ti₃AlC | Ti₃Al | 0.1-1.5 | TiC, Ti₃AlC | — | 0.2-2 | |
| ZrC/Ni₃Al | ZrC, Ni₃Al, Ni₇Zr₂ | Ni₅Zr | 1 | ZrC, Zr, Ni, Ni₃Al | — | 0.5 | Intermetallics of Ni and Zr are probably unstable phases |
| ZrC/Ti₃Al | TiC, Ti₃Al, Ti₃AlC | AlZr₃ | none | Ti₃AlC, TiC, Al₂Zr | — | none | Did not form ZrC dispersoid, due to greater stability of TiC, Ti₃AlC |
| TiB/Ti₃Al (10 vol %) | Ti₃Al | TiB | Ti₂Al | — | — | — | |
| TiB/Ti₃Al (30 vol %) | Ti₃Al | TiB | Ti₂Al | — | — | — | |
| TiB and TiC/ Ti₃Al | TiC TiB Ti₃Al | — | — | — | — | — | Using B₄C as reactant |
| TiB₂/TiAl | TiAl | TiB₂ | — | — | — | — | |
| TiC/TiAl | TiC TiAl | Ti₃Al Ti₂Al | — | — | — | — | |

EXAMPLE 9

An intermetallic-ceramic composite having mixed ceramic dispersoids is prepared by mixing 11.0 grams of Al₄C₃, 33.8 grams of tantalum, and 135.2 grams of niobium, and heating in a graphite induction furnace. Analysis of the recovered product reveals the presence of both TaC and Ta₂C in a matrix of Nb₃Al.

EXAMPLE 10

An intermetallic-ceramic composite comprising a ceramic dispersoid in a mixed intermetallic matrix is prepared by mixing 43.6 grams of titanium, 123.6 grams of tantalum, and 32.8 grams of Al₄C, compacting, and reacting on a water cooled copper holder in an induction furnace under flowing argon. Upon recovery of the reaction product, X-ray analysis shows the presence of TiC and a mixed matrix of TiAl, TaAl₃, and TaAl₂.

EXAMPLE 11

An intermetallic-ceramic composite of titanium diboride in a matrix of titanium aluminide (Al₃Ti) is prepared by the master concentrate route. A solidified melt comprising 30 weight percent titanium diboride in a titanium aluminide matrix is comminuted to particles having an average size of about 1 millimeter, and then a melt of about 860 grams of titanium aluminide is prepared under a protective inert atmosphere. The particles are then added to the melt and held at that temperature for a sufficient period of time to insure complete melting of the intermetallic phase of the particles, and a uniform distribution of the titanium diboride. The melt is then solidified to yield a composite of 15 weight percent titanium diboride dispersed in a titanium aluminide matrix.

EXAMPLE 12

An intermetallic-ceramic composite is prepared by the direct addition route, by mixing 65.5 grams of titanium, 10 grams of boron, and 24.2 grams of aluminum, compacting, and incrementally adding to a molten pool of TiAl under inert atmosphere. On addition of the compact to the molten pool, a reaction occurs resulting in the formation of fine, evenly dispersed TiB₂ particles. Upon completion of the addition, the mixture is cast and recovered as a dispersion of TiB₂ in a matrix of TiAl.

While it is believed that all of the composite materials produced by the methods exemplified above may be subjected to rapid solidification in accordance with the present invention, the following examples set forth specific experimental data relative to this invention.

Ingots of intermetallic-second phase composite material produced in accordance with the present invention are converted into powder using conventional inert gas centrifugal atomization techniques. These techniques involve heating the ingot until melting of the intermetallic matrix is complete, followed by rapid solidification of the melt to form a composite powder. Compositions of the intermetallic-second phase composites ingots atomized are given in Table II.

TABLE II

| Matrix Composition (atomic percent) | Dispersoid Loading (weight percent) | Dispersoid Composition |
|---|---|---|
| Ti—45 Al | 7.5 | TiB₂ |
| Ti—45 Al | 10.0 | TiB₂ |
| Ti—45 Al | 10.0 | TiB₂/TiC |
| Ti—45 Al | 7.5 | TiB₂/TiN |
| Ti—48 Al | 7.5 | TiB₂ |
| Ti—48 Al—4 Nb | 7.5 | TiB₂ |
| Ti—48 Al—2 V | 7.5 | TiB₂ |
| Ti—45 Al—0.5 Er | 7.5 | TiB₂ |
| Ti—47 Al—6 Nb—0.5 Er | 6.0 | TiB₂ |
| Ti—47 Al—10 Nb—0.5 Er | 6.0 | TiB₂ |
| Ti—45 Al—0.5 Er | 7.5 | TiB₂/TiN |
| Ti—45 Al | 4.5 | NbB₂ |
| Ti—45 Al—5 Mo | 9.0 | NbB₂ |

Upon chemical analysis of the as-atomized powder, it is noted that material containing TiB₂ in the precursor ingot was more resistant to carbon contamination from the graphite melting crucible, relative to alloys which did not previously contain TiB₂. For example, a composite comprising 7.5 volume percent TiB₂ particles dispersed within a Ti-45Al matrix produced in accordance with the methods of the present invention is found to contain 0.116 weight percent carbon. A composite comprising 7.5 volume percent TiB₂ particles dispersed within a Ti-48Al-4Nb matrix is found to contain 0.085 weight percent carbon, while a composite comprising 7.5 volume percent TiB₂ particles dispersed within a Ti-47Al-3Nb matrix is found to contain 0.125 weight percent carbon.

Upon microstructural examination of the as-atomized powder, several features unique to the RS products of the present invention are observed.

Figures 1, 2:
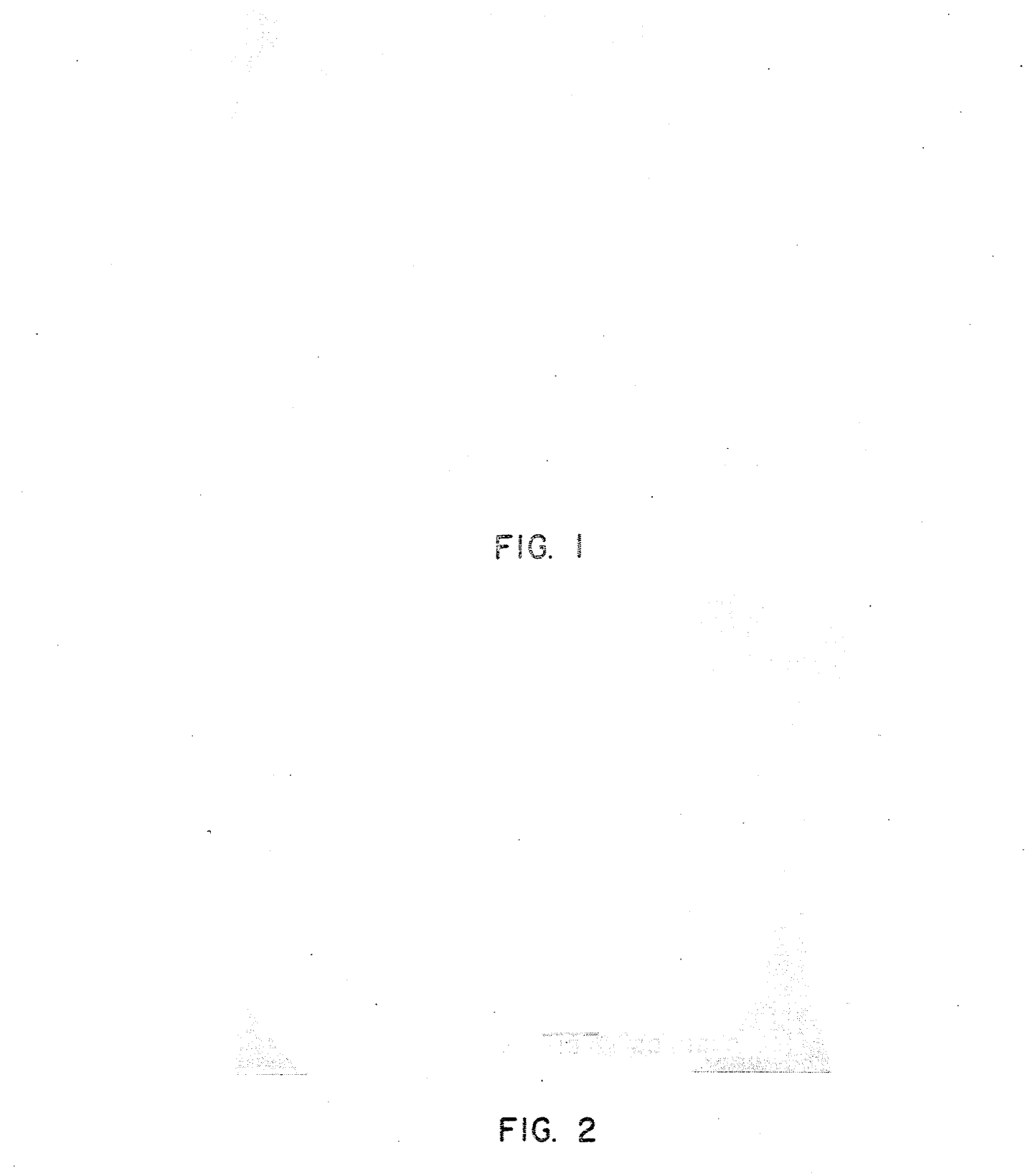

The intermetallic matrices of rapidly solidified powders produced by the methods of the present invention have been found to be devoid of dedritic structure which is otherwise present in conventional RS powders. FIG. 2, which is a photomicrograph showing a cross section of a conventional unreinforced, rapidly solidified titanium aluminide (Ti-48Al) powder, illustrates the dendritic microstructure present in prior art RS powders. By comparision, no such dendritic microstructure is observed in the RS powders of the present invention (see FIG. 1).

Figures 3, 4:
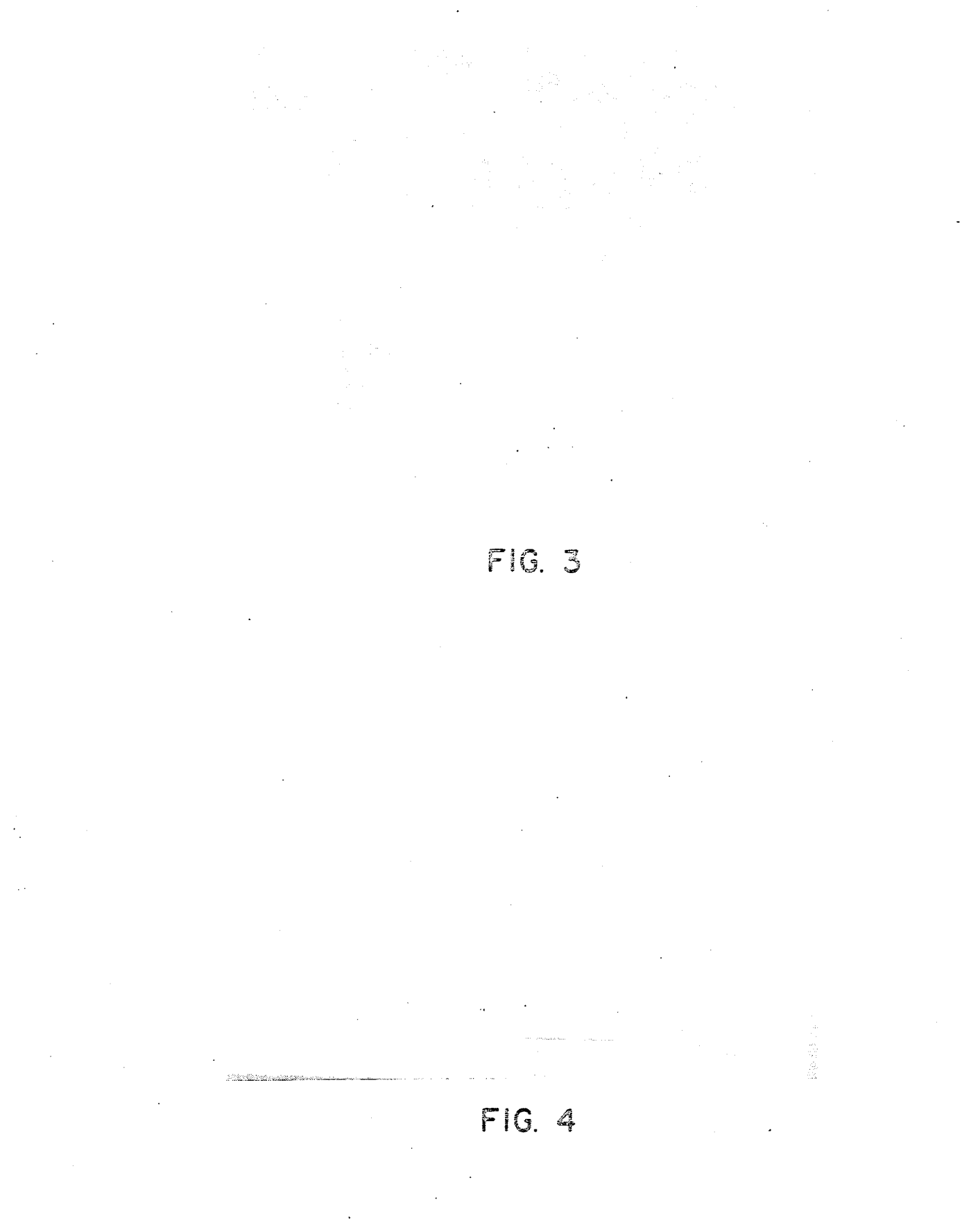

In the case of RS powders comprising $TiB_2$ particulates within titanium aluminide matrices, the presence of fine boride particles with a flake-like morphology is observed within the microstructure of each powder particle. Chemical dissolution of the matrix coupled with subsequent x-ray diffraction identifies this flake-like RS phase as $TiB_2$. This phase apparently forms as a result of high undercooling and enhanced nucleation kinetics attributable to the rapid solidification technique. It can thus be inferred that a higher solubility of boron exists in the molten state relative to that in the solid state. In addition, the presence of equiaxed $TiB_2$ particulates of comparable size and morphology to those present in the starting ingots is observed, indicating that a substantial portion of the pre-formed second phase particles have survived the remelting and subsequent RS atomization process. Thus, in RS powders comprising $TiB_2$ particulates within titanium aluminide matrices, a bimodal distribution is achieved comprising equiaxed $TiB_2$ particles in the size range of about 1 to 5 microns and finer flake-like $TiB_2$ particles. The widths of these flake-like particles may range from about 0.05 to about 0.2 microns, while the lengths may range from about 0.5 to about 5 microns. FIG. 1 illustrates the microstructure of an RS powder produced in accordance with the present invention comprising a bimodal distribution of equiaxed and flake-like $TiB_2$ particulates within a Ti-48Al-4Nb matrix. FIG. 3 illustrates a similar microstructure comprising a bimodal distribution of equiaxed and flake-like $TiB_2$ particulates within a Ti-45Al matrix.

Upon heat treatment of the titanium aluminide-$TiB_2$ RS powders produced by the present invention, the flake-like $TiB_2$ particles described above undergo a change in shape, with a reduction in aspect ratio approaching spherical. The resulting particulate distribution is superior to that of the precursor ingot material in terms of its reduced particle size, improved particle distribution, and increased number density. The efficiency of the morphological transformation has been found to increase with increasing heat treatment temperatures to approximately 1125° C. Thus, after heat treatment, a bimodal distribution is achieved comprising larger equiaxed $TiB_2$ particles in the size range of about 1 to about 5 microns and finer equiaxed $TiB_2$ particles in the size range of about 0.1 to about 1 micron. FIG. 4 illustrates the microstructure of a heat treated RS powder produced in accordance with the present invention comprising a bimodal distribution of equiaxed $TiB_2$ particulates within a Ti-48Al-2V matrix.

It is understood that the above description of the present invention is susceptible to considerable modification, change, and adaptation by those skilled in the art. Rapidly solidified products of the present invention may be used with prior art powder metallurgy techniques for forming composites, for example. The product of the present invention may also be subjected to subsequent heat treatment or combination with prior art products and structures, including filaments, and the like. Accordingly, all such modifications, changes, and adaptations are intended to be considered to be within the scope of the present invention, which is set forth by the appended claims.

We claim:

1. A rapidly solidified composite powder comprising boride, carbide, nitride or silicide second phase particles dispersed within a titanium aluminide containing matrix.

2. The rapidly solidified composite powder of claim 1, wherein the titanium aluminide is $Ti_3Al$, TiAl or a combination thereof.

3. The rapidly solidified composite powder of claim 1, wherein the titanium aluminide is TiAl, $TiAl_3$ or a combination thereof.

4. The rapidly solidified composite powder of claim 1, wherein the second phase particles comprise from about 1 to about 40 volume percent of the composite.

5. The rapidly solidified composite powder of claim 1, wherein the second phase comprises $TiB_2$.

6. The rapidly solidified composite powder of claim 5, wherein the $TiB_2$ particles comprise a bimodal distribution characterized by substantially equiaxed $TiB_2$ particles in a size range between about 1 and about 5 microns and flake-like $TiB_2$ particles having widths between about 0.05 and about 0.2 microns and lengths between about 0.5 and about 5 microns.

7. The rapidly solidified composite powder of claim 6, wherein the titanium aluminide containing matrix is substantially dendrite free.

8. The rapidly solidified composite powder of claim 5, wherein the titanium aluminide is $Ti_3Al$, TiAl or a combination thereof.

9. The rapidly solidified composite powder of claim 5, wherein the titanium aluminide is TiAl, $TiAl_3$ or a combination thereof.

10. The rapidly solidified composite powder of claim 5, wherein the titanium aluminide is alloyed with additional elements.

11. The rapidly solidified composite powder of claim 5, wherein the $TiB_2$ particles comprise from about 0.5 to about 40 volume percent of the composite.

12. The rapidly solidified composite powder of claim 5, wherein the $TiB_2$ particles are in-situ precipitated.

13. The rapidly solidified composite powder of claim 1, further comprising a dispersion of rare earth oxide particulates within the titanium aluminide containing matrix.

14. The rapidly solidified composite powder of claim 13, wherein the rare earth oxide is erbium oxide.

15. A heat treated rapidly solidified composite material comprising $TiB_2$ second phase particles dispersed within a titanium aluminide containing matrix wherein the TiBw particles comprise a bimodal distribution characterized by substantially equiaxed $TiB_2$ particles in a size range between about 1 and about 5 microns and finer substantially equiaxed $TiB_2$ particles in a size range between about 0.1 and about 1 micron.

* * * * *

UNITED STATES PATENT AND TRADEMARK OFFICE
CERTIFICATE OF CORRECTION

PATENT NO. : 5,015,534
DATED : May 14, 1991
INVENTOR(S) : Stephen L. Kampe et al It is certified that error appears in the above-identified patent and that said Letters Patent is hereby corrected as shown below:

Column 12, line 18, "104°C." should read --$10^4$°C--.
Column 15, line 38, "$A_{14}C$" should read --$Al_4C$--.
Column 18, line 63, "TiBw" should read -- $TiB_2$--.

Signed and Sealed this

Thirteenth Day of October, 1992

Attest:

DOUGLAS B. COMER

Attesting Officer        Acting Commissioner of Patents and Trademarks